May 13, 1952  F. J. JOHNSON ET AL  2,596,408
MEANS FOR SCREW-TIGHTENING CAPS ON JARS BY FRICTIONAL
PRESSURE WHICH DIMINISHES AS TIGHTENING PROCEEDS
Filed April 8, 1948  14 Sheets-Sheet 1

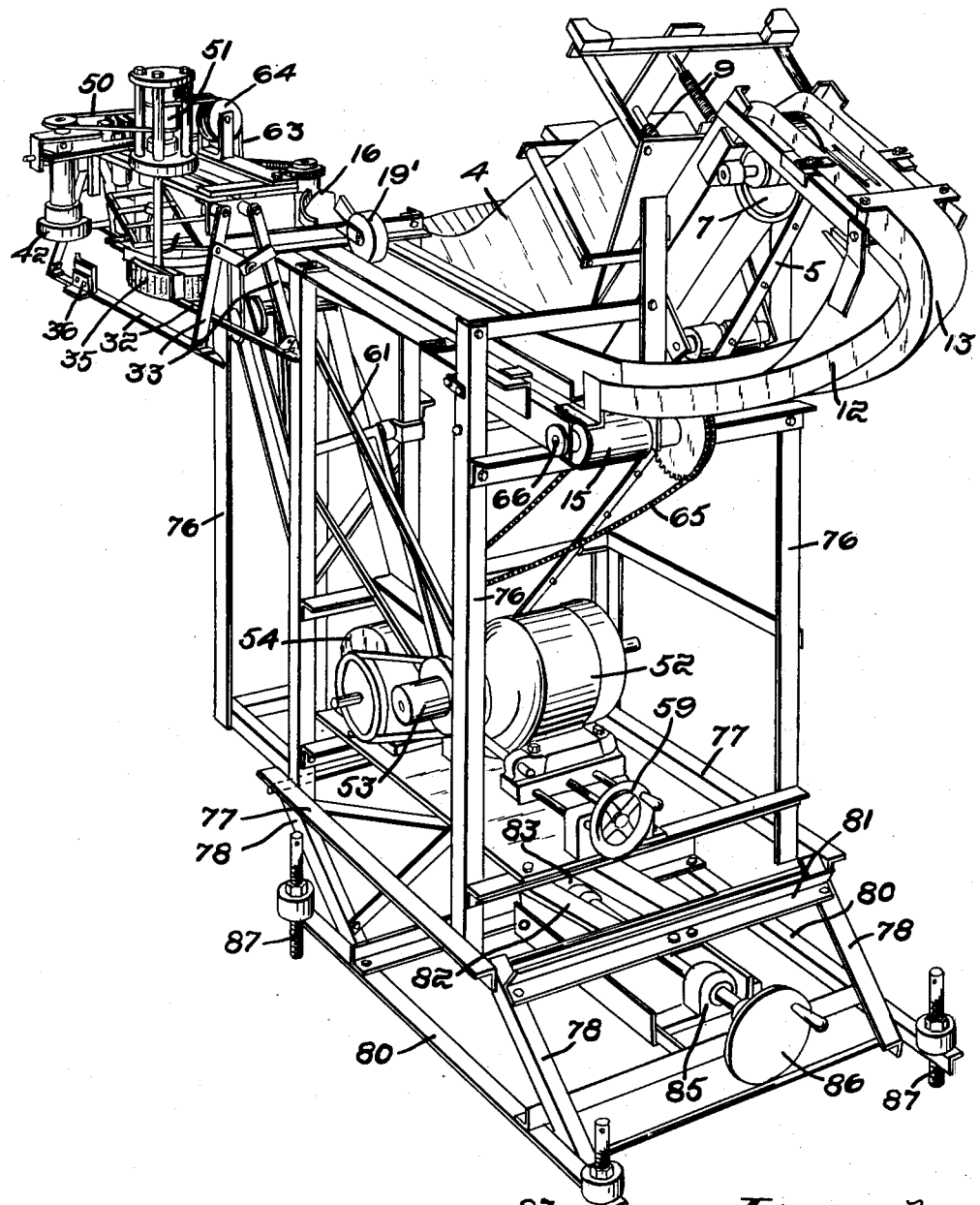

May 13, 1952     F. J. JOHNSON ET AL     2,596,408
MEANS FOR SCREW-TIGHTENING CAPS ON JARS BY FRICTIONAL
PRESSURE WHICH DIMINISHES AS TIGHTENING PROCEEDS
Filed April 8, 1948     14 Sheets-Sheet 5

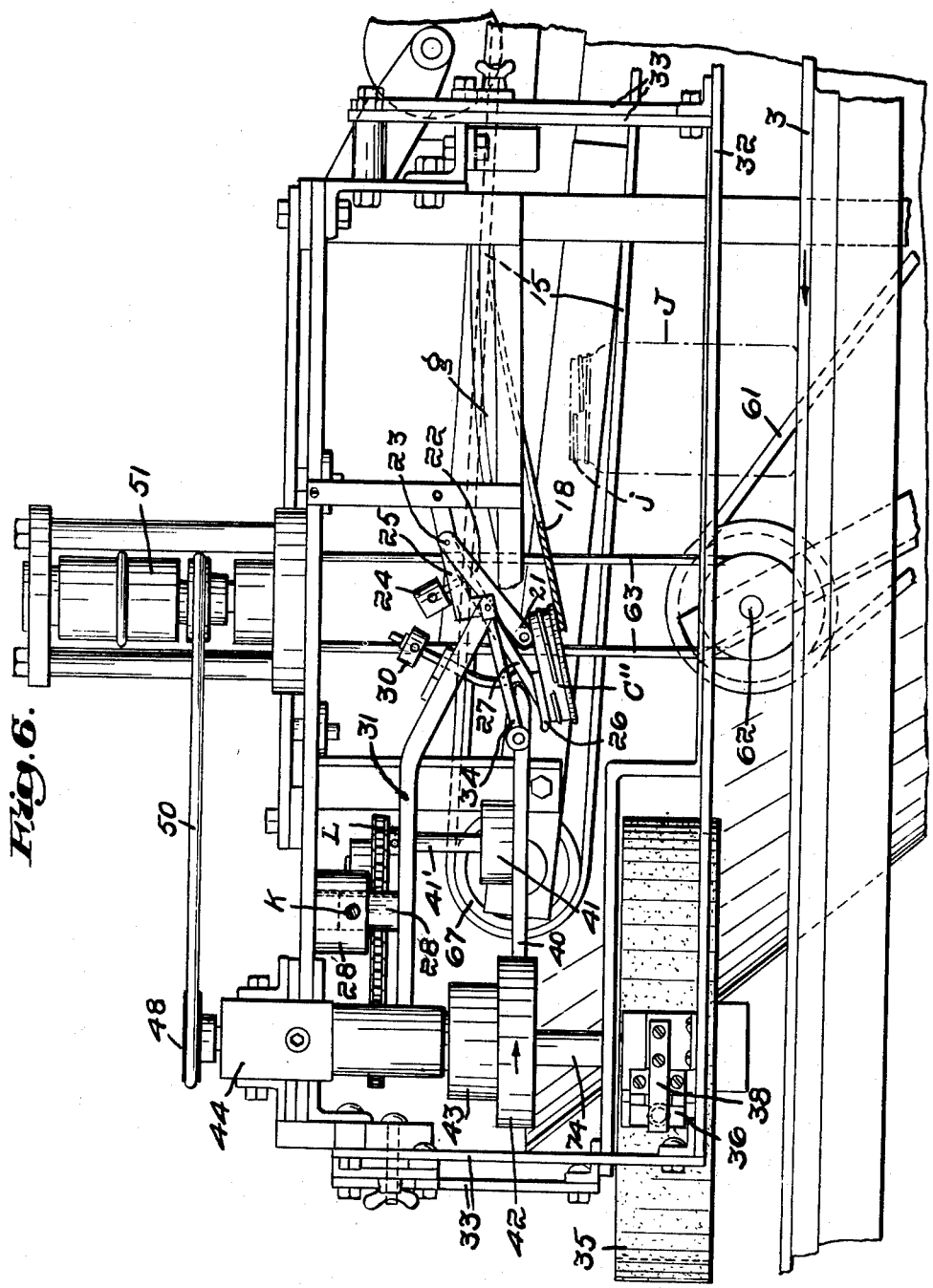

May 13, 1952     F. J. JOHNSON ET AL     2,596,408
MEANS FOR SCREW-TIGHTENING CAPS ON JARS BY FRICTIONAL
PRESSURE WHICH DIMINISHES AS TIGHTENING PROCEEDS
Filed April 8, 1948                        14 Sheets-Sheet 7
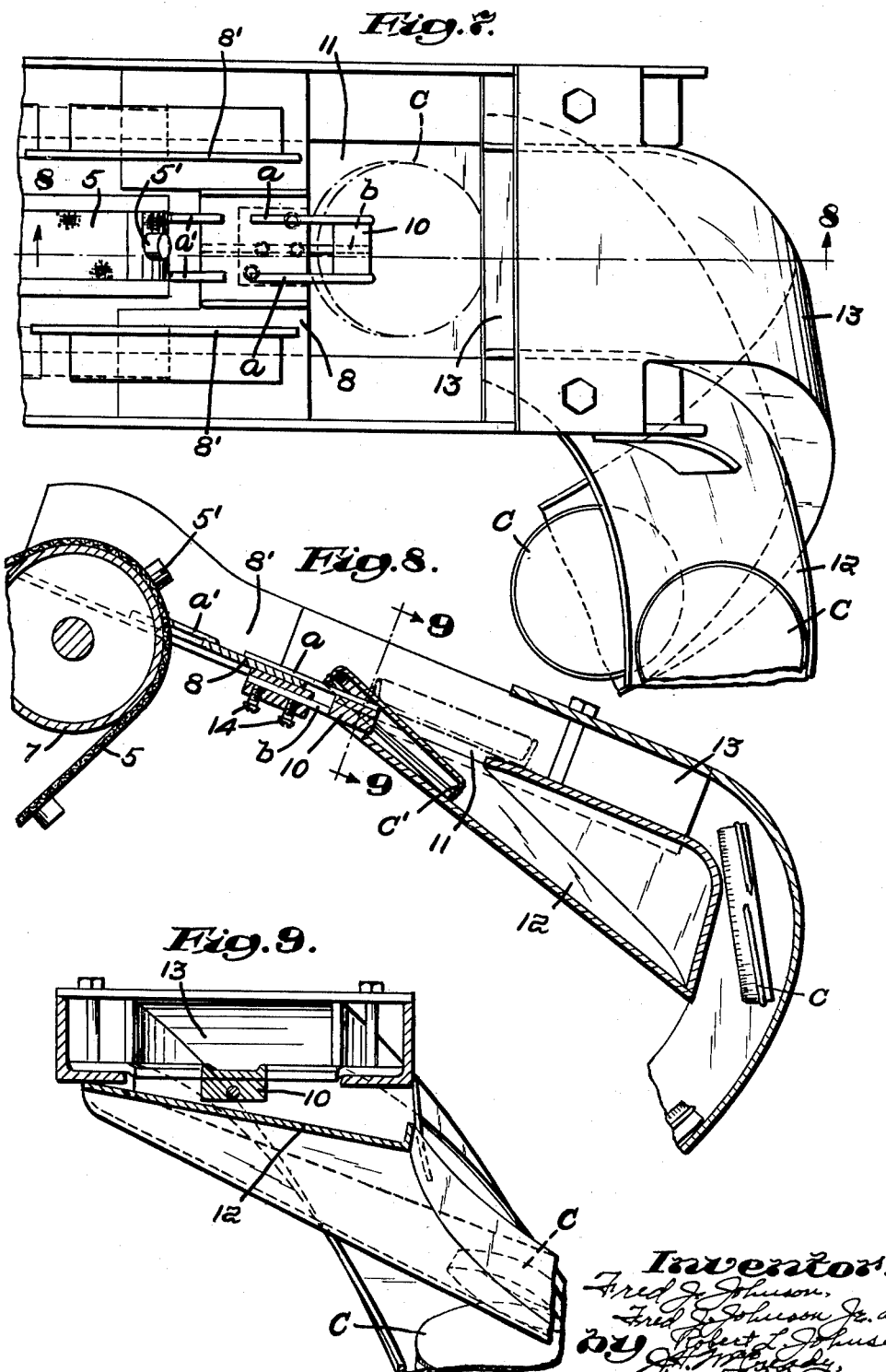

May 13, 1952      F. J. JOHNSON ET AL      2,596,408
MEANS FOR SCREW-TIGHTENING CAPS ON JARS BY FRICTIONAL
PRESSURE WHICH DIMINISHES AS TIGHTENING PROCEEDS
Filed April 8, 1948      14 Sheets-Sheet 8
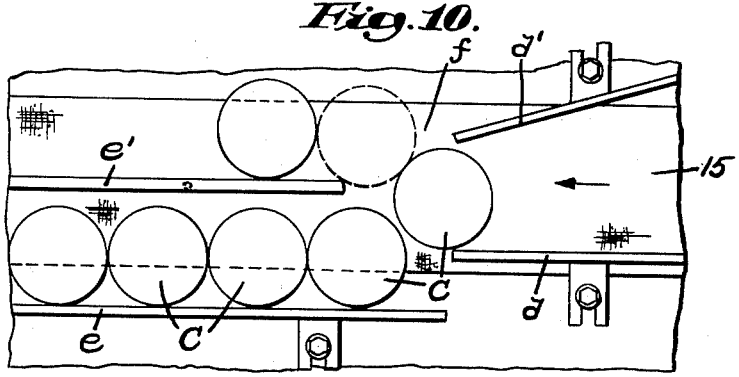
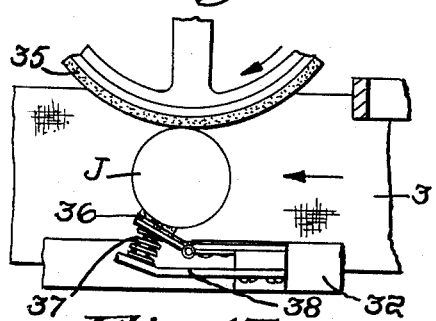
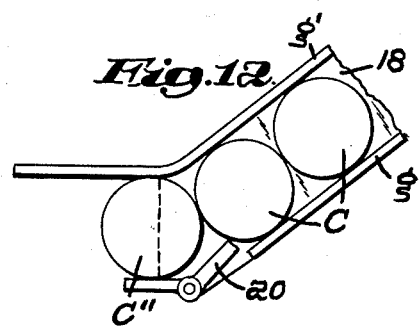
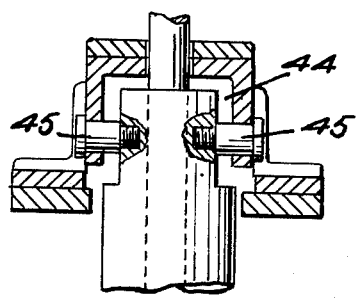
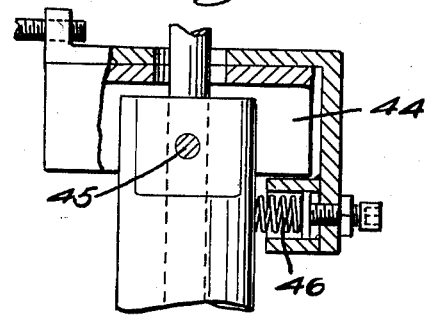

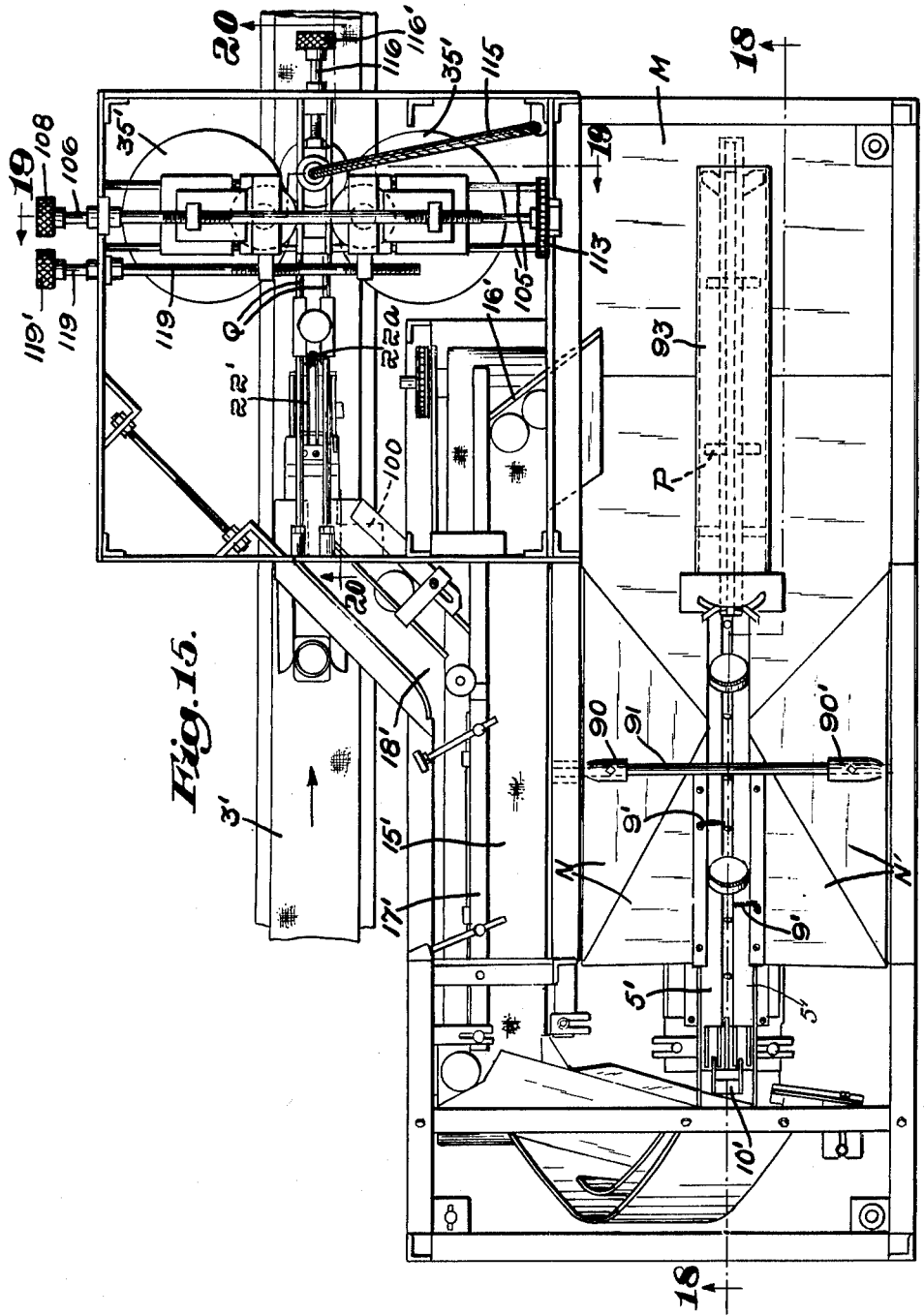

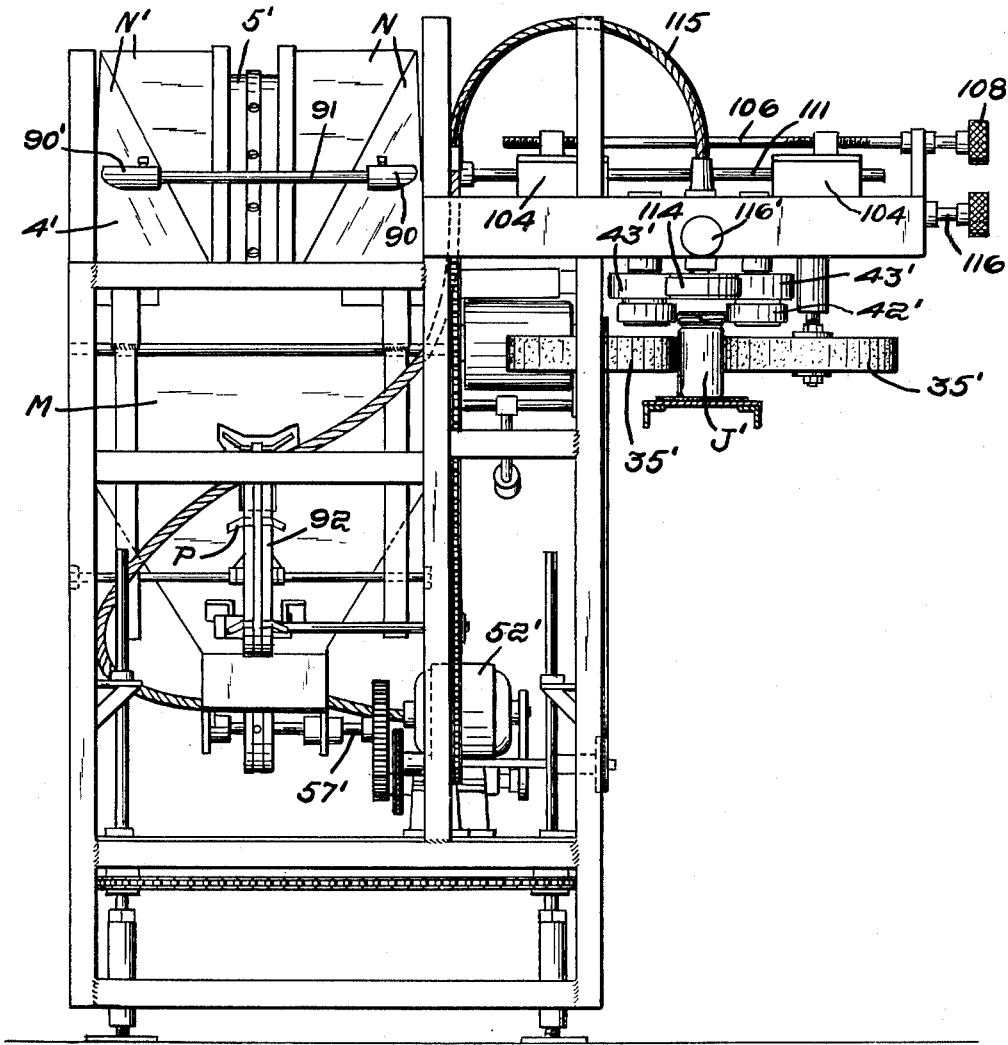

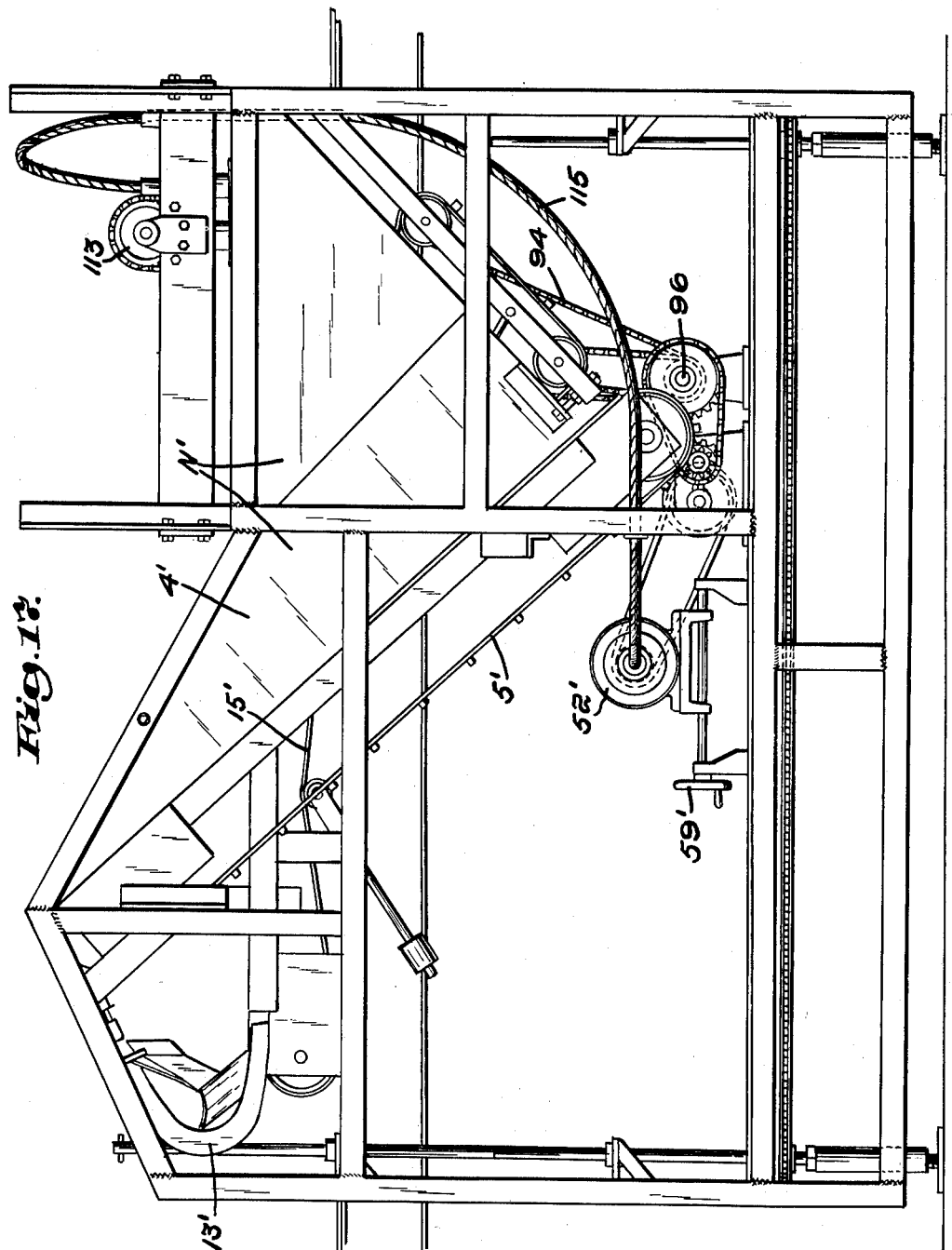

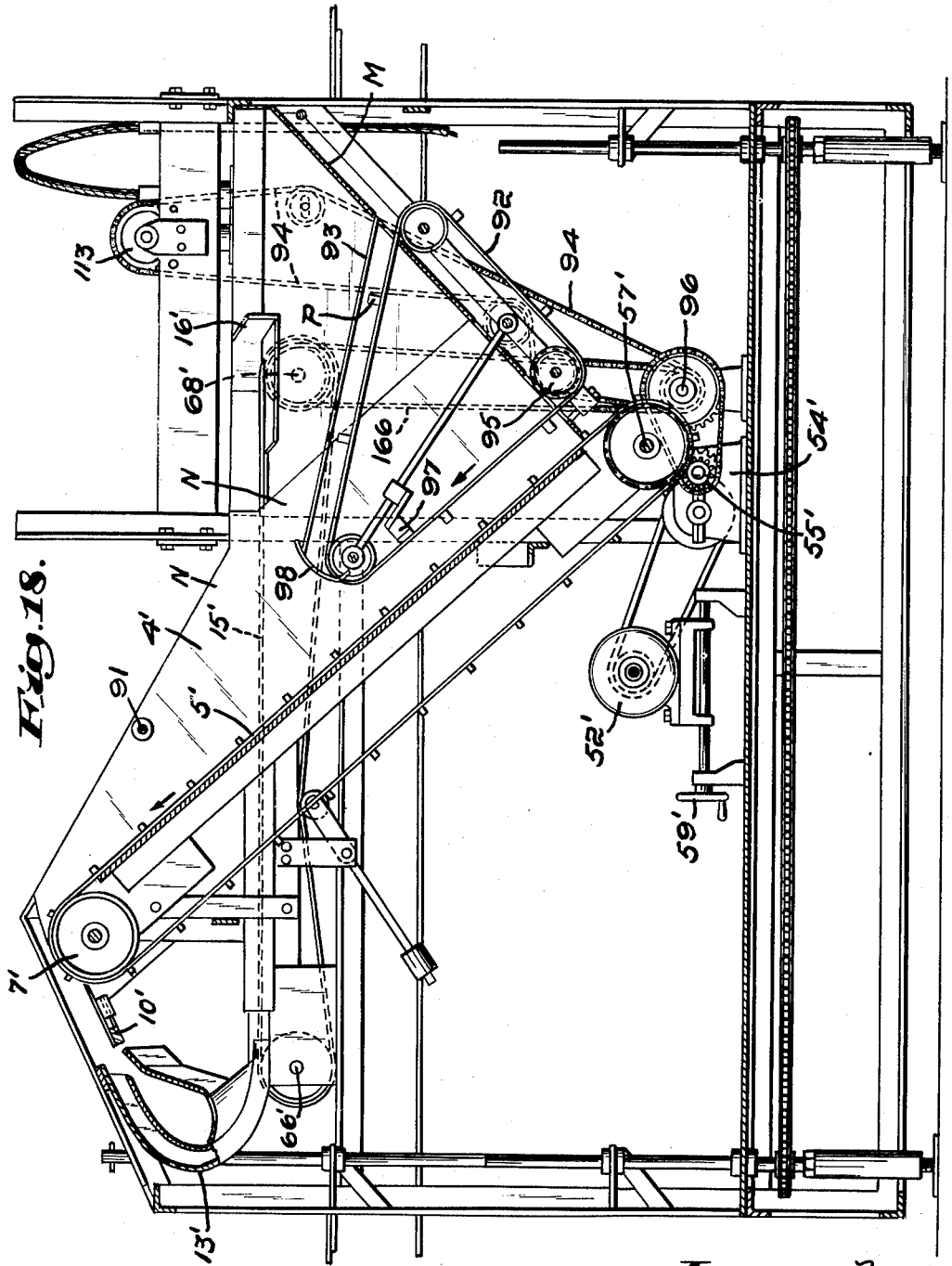

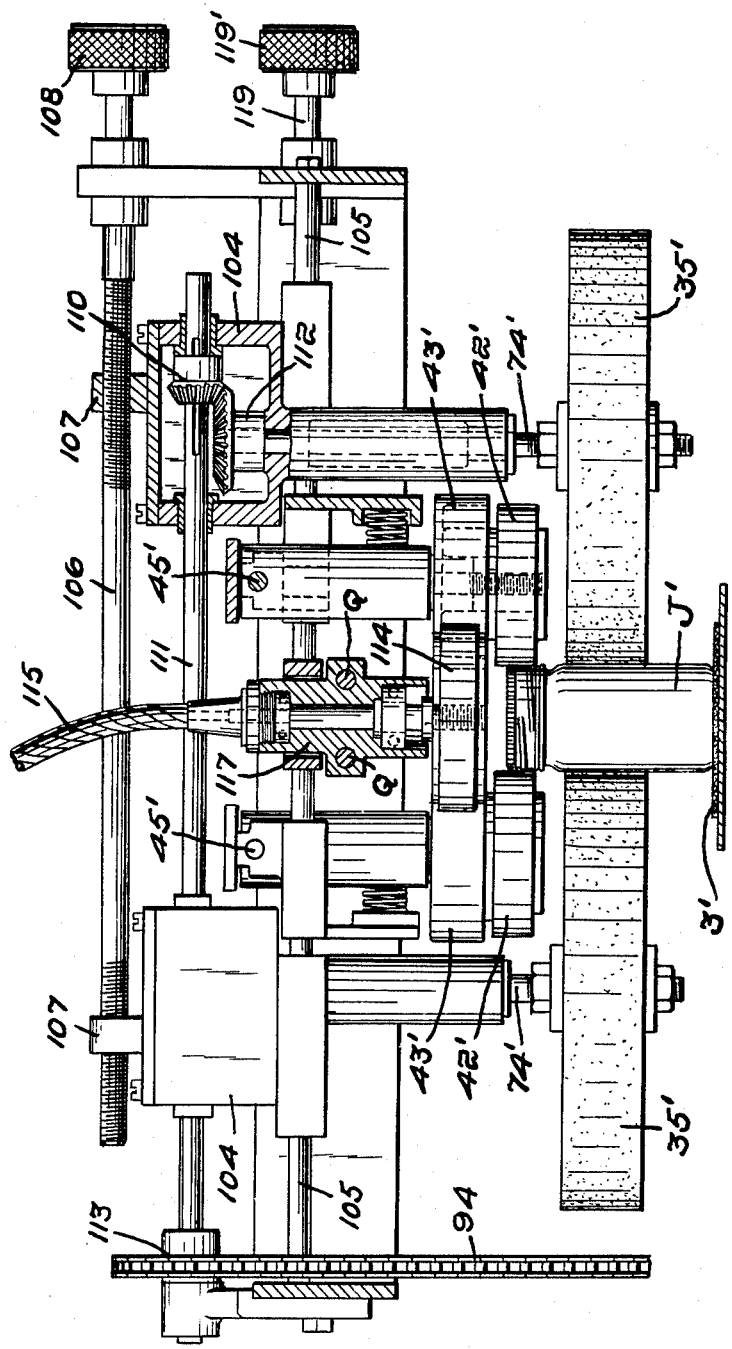

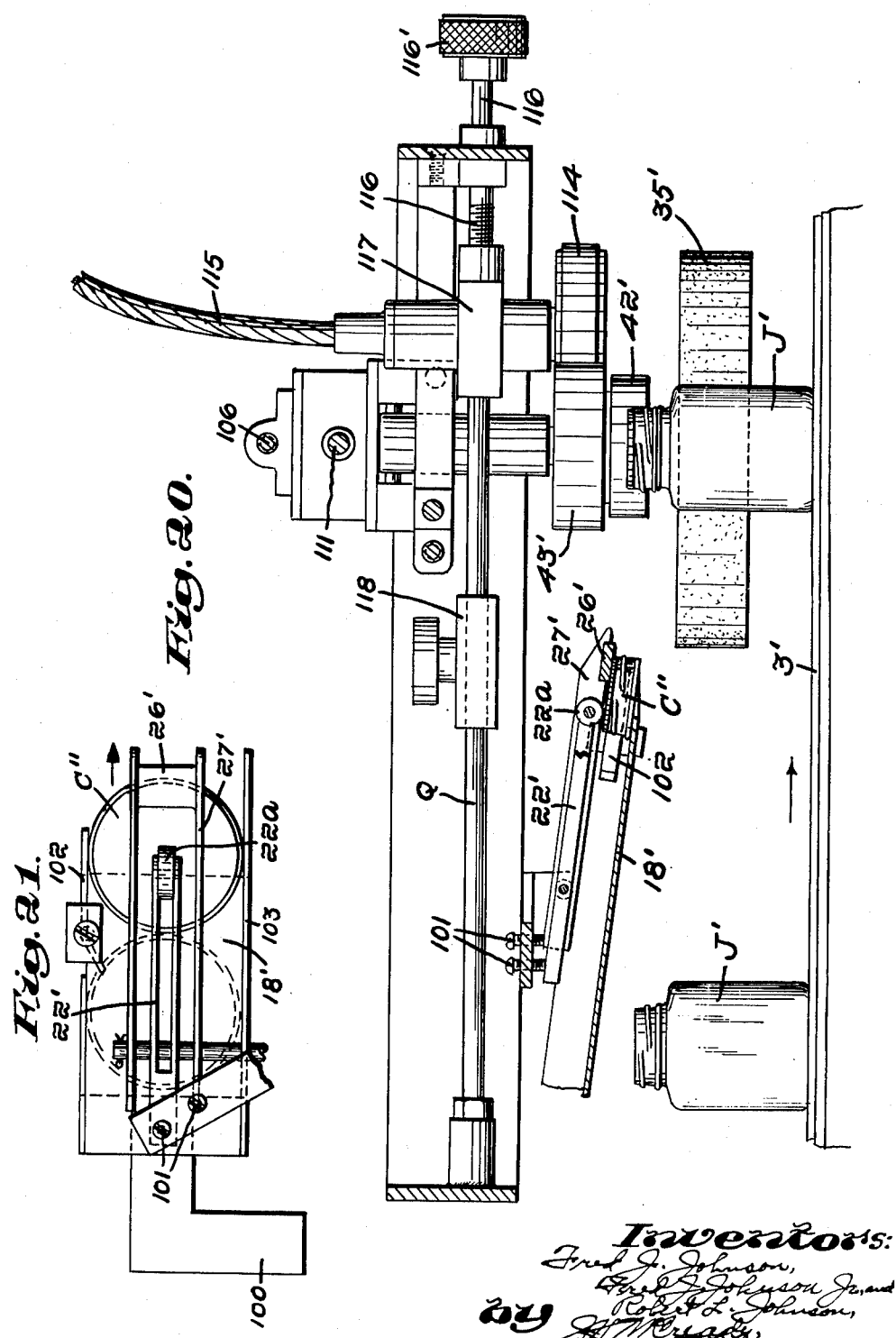

Patented May 13, 1952

2,596,408

UNITED STATES PATENT OFFICE 2,596,408

MEANS FOR SCREW-TIGHTENING CAPS ON JARS BY FRICTIONAL PRESSURE WHICH DIMINISHES AS TIGHTENING PROCEEDS

Fred J. Johnson, Fred J. Johnson, Jr., and Robert L. Johnson, Needham Heights, Mass., assignors to The Kinex Company, Needham Heights, Mass., a corporation of Massachusetts Application April 8, 1948, Serial No. 19,676

9 Claims. (Cl. 226—88)

This invention relates to machines for applying screw caps or covers to jars, bottles, and similar containers. For convenience, those containers to which this invention is applicable will be herein referred to collectively as "jars."

The prior art machines for capping jars automatically have been complicated; require much attention; and are difficult to adjust to accommodate either jars of different shapes and diameters, or caps or different dimensions. The present invention aims to devise a completely automatic machine in which not only will these objectionable features be eliminated but which, in addition, will have an exceptionally high rate of production and be extremely dependable.

The invention involves both a novel method and also a new machine designed primarily to practice that method.

The nature of the invention will be readily understood from the following description when read in connection with the accompanying drawings, and the novel features will be particularly pointed out in the appended claims.

In the drawings,

Fig. 4 is a perspective view of the machine;

Fig. 5 is a plan view of parts at the top of the machine illustrating the mechanism for feeding the caps to the capping station;

Fig. 6 is a side elevation illustrating details of the mechanism for registering the caps with successive jars as they pass through the capping station and showing, also, some parts of the mechanism for tightening the cap;

Fig. 7 is a plan view of a part of the cap feeding mechanism;

Fig. 8 is a sectional view taken substantially on the line 8—8, Fig. 7;

Fig. 9 is a sectional view on the line 9—9, Fig. 8;

Fig. 10 is a plan view of a portion of the cap feeding mechanism illustrating the manner in which surplus caps are discarded;

Fig. 11 is a plan view showing parts of the mechanism for feeding the capped jars away from the capping station;

Fig. 12 is a plan view of the mechanism for controlling the movement of the caps to the capping station;

Figs. 13 and 14 are vertical, sectional views, partly in elevation, of the tightening roll bearings and pivots;

Fig. 15 is a plan view of a modified embodiment of the invention;

Fig. 16 is an elevation at the rear or delivery end of the machine shown in Fig. 15;

Fig. 17 is a side elevation of said machine;

Fig. 18 is mainly a sectional view through the hopper of the machine shown in Fig. 15;

Fig. 19 is a sectional view taken approximately on the line 19—19, Fig. 15;

Fig. 20 is a similar view taken substantially on the line 20—20 of Fig. 15; and

Fig. 21 is a plan view showing more clearly some details of the cap releasing mechanism illustrated in Fig. 15.

Figure 1:
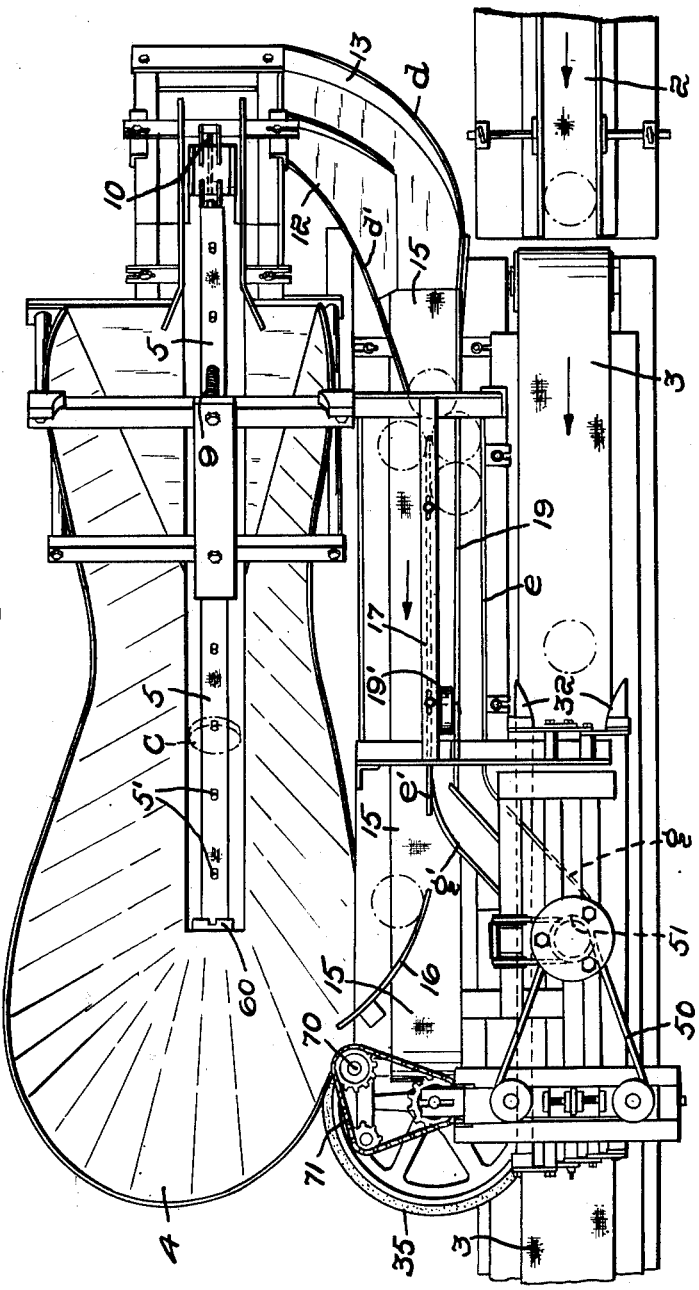
Fig. 1 is a plan view of a machine embodying this invention.

The method provided by this invention comprises the steps of conveying the jars to be capped continuously through a capping station; feeding caps from a source of supply to said station at such a rate as to deliver a cap for each jar; positioning successive caps at said station for accurate register with the jars as they arrive at the capping point; properly positioning each cap on its respective jar; and, as the jars are carried forward, rotating each cap to tighten it firmly on its respective jar. The machine shown in the drawings performs these various operations in the proper time relationship to each other to select the caps from a mass; convey them to the capping station; position them on the respective jars, and tighten them to complete the capping operation.

Figure 2:
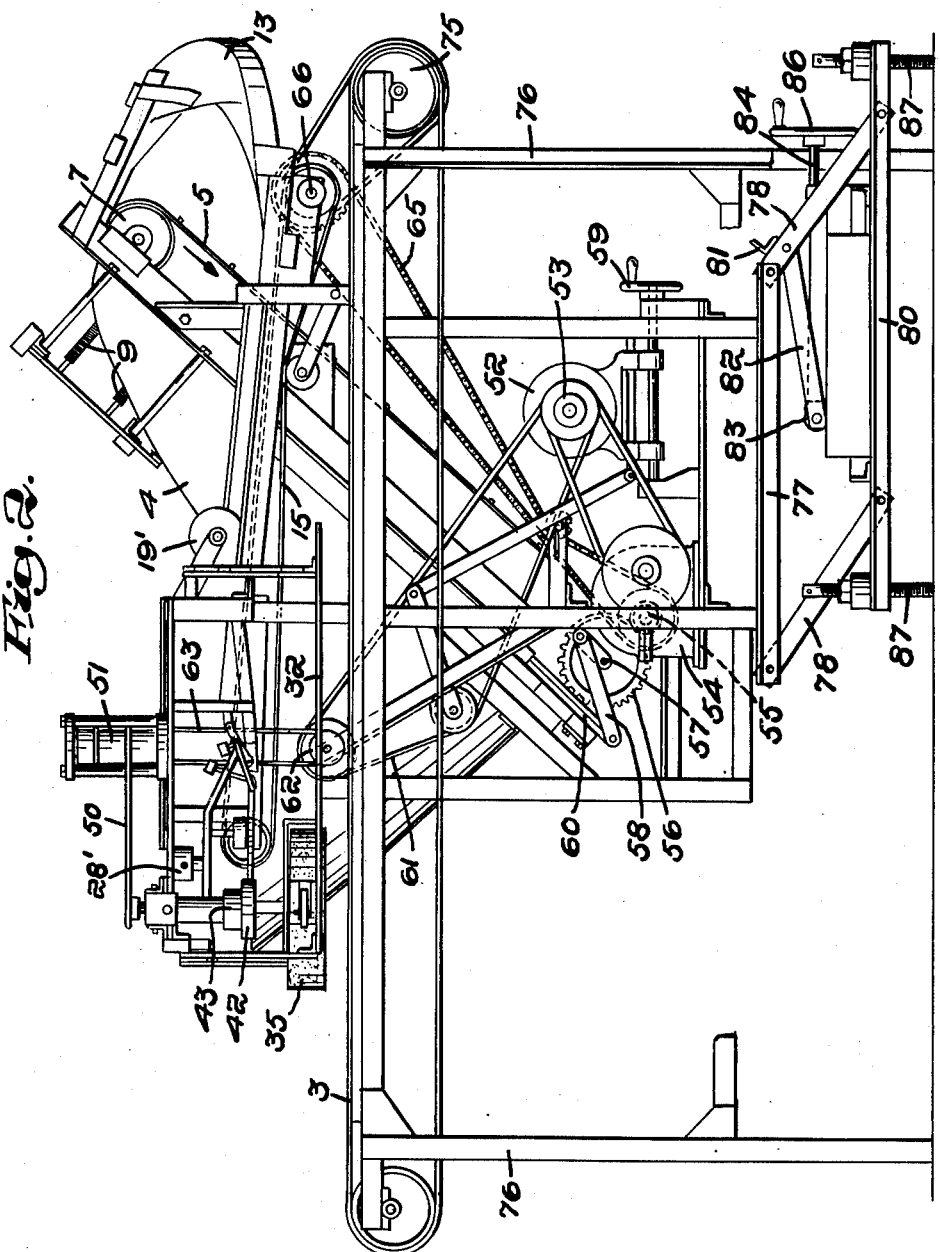
Fig. 2 is a side elevation of the machine shown in Fig. 1.

Referring first to Figs. 1 and 2, the jars are delivered to the machine by the conveyor 2, Fig. 1, and are deposited on the upper horizontal run of another conveyor 3 which may be either individual to the machine or may be a continuation of the delivery conveyor 2 of the filling machine. The conveyor 3 carries the jars in a straight line and at a substantially constant speed through the capping mechanism.

Figure 3:
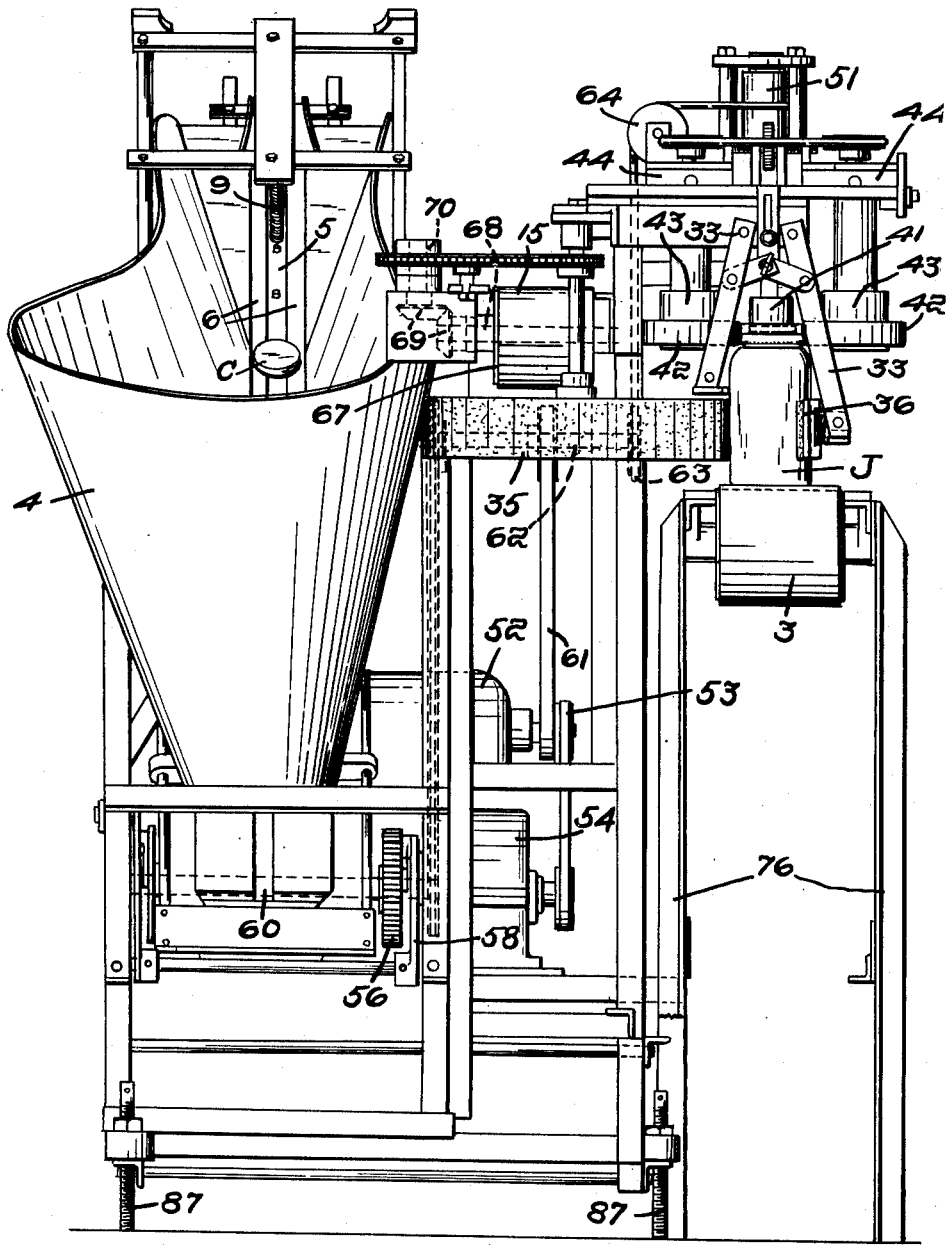
Fig. 3 is a rear elevation of said machine.

A supply of caps is maintained in a loosely tumbled mass in a hopper 4, the hopper being tapered both laterally and longitudinally to guide them into contact with the upwardly travelling run of a pin conveyor 5, Figs. 1, 2 and 3. Most of these caps are approximately cup-shaped but have a flat top, and they are provided with an approximately cylindrical rim having some type of screw thread pressed in to it. Some of these caps are shown at C in Figs. 1 and 3. As the conveyor belt moves upwardly through the hopper the pins 5' catch under or against the flanges or rims of caps so positioned as to permit such engagement, and they are thus carried up out of the hopper, riding on the rails 6—6, Fig. 3, at the opposite sides of the conveyor belt. When they reach the upper or delivery end of the conveyor, where the latter turns around the guide pulley 7, Fig. 8, they drop off on to the floor of a delivery chute 8, this floor being inclined, as shown in Figs. 8 and 9, so that the caps slide down through it. Coiled springs 9, suspended at intervals from overhead frame pieces with their lower ends spaced slightly above the path of travel of the caps on the conveyor, serve to brush off any cap which rides up on another.

Some of the caps delivered by the conveyor will be upside down with their flanges extending upwardly, while others will be right-side up with the edges of the flanges resting on the bottom of the chute. It is necessary to turn over those caps which are bottom-side up. For this purpose the caps are separated at this point, those which are right-side up going in one path and the others in a different path. This operation is accomplished by leaving an opening 11 in the floor of the chute and providing a short narrow plate 10, Figs. 7 and 8, extending in to said opening and so positioned that all the caps pass over it immediately after being discharged by the conveyor. The plate is made considerably smaller in width than the diameter of the cap, so that those which are right-side up, as shown at C', Fig. 8, drop over the edge of the plate and slide through a chute 12. Lateral upright plates 8'—8', Fig. 7, guide the caps as they are delivered by the conveyor so that they are compelled to run directly across the plate 10. Those caps which are bottom-side up acquire sufficient momentum as they slide over the plate to jump the slot 11 and continue to slide down through a second chute 13 above the chute 12. Because the position of the plate 10 requires adjustment backward or forward to handle caps of different dimensions, it is provided with backwardly extending legs, two of which, as shown at $a$, ride on top of the chute 8, while a third leg $b$ extends under the bottom of the floor of the chute and through a stationary guide block in which it is adjustably fastened by set screws 14, Fig. 8. Two short pins $a'$—$a'$, Fig. 7, welded to the plate 10 extend backwardly almost to the belt 5 and assist in the delivery of the caps.

As best shown in Fig. 4, the chute 12 is curved to deliver its caps on the upper run of a conveyor 15, while those caps which were bottom-side up are upended and thereby inverted as they pass through the 180° curve of the chute 13, and after being so inverted they also are delivered to the lower part of the chute 12 and thence to the receiving end of the conveyor 15. Guide rails $d$—$d'$, Figs. 1 and 10, at the opposite sides of the delivery end of the chute 12 direct the caps on to approximately the central portion of the conveyor 15, as clearly shown in Fig. 10, and additional rails $e$—$e'$, the latter located at approximately the center line of the conveyor and the former off to one side, direct one line of caps along toward the capping station, while surplus caps are forced through a gap $f$ between the delivery end of the guide $d'$ and the receiving end of the guide $e'$. This action occurs partly because of the angle of the guide $d'$ at its delivery end, but more particularly due to the motion imparted to the caps by the belt 15. An oversupply of caps is delivered through the chutes 12 and 13, and the surplus is forced through the gap $f$, Fig. 10, and is carried along by the conveyor 15 until the caps strike a deflector 16, Fig. 1, which guides them back into the hopper 4. The rail $e$ is adjustable laterally, as shown in Fig. 1, toward and from the rail $e'$ to accommodate caps of different widths, and the rail $e'$ is adjustably supported on the bar 17, Fig. 1, so that it can be moved backward or forward to adjust the width of the escape gap $f$.

At the end of the cap guideway or run provided by the rails $e$ and $e'$, additional rails $g$ and $g'$, Fig. 5, are positioned to form a continuation of the guideway and to lead the caps down to the capping point. This term "capping point" is here used to designate the point at which the cap meets the jar and is positioned on it for the subsequent steps necessary to complete the capping operation.

Referring to Figs. 5 and 6, the guideway between the rails $g$ and $g'$ is, of course, provided with a bottom plate 18. As shown in Fig. 12, the foremost cap in the line guided between these rails passes through a gate 20 and stops after it has passed partly over the edge of the bottom plate 18. It is held there by the pressure of the forward arm of the gate which crowds the cap C" against the rail $g'$, this result being produced mainly by pressure of the line of caps behind the cap C" where the foremost cap of this line acts on the rear arm of the gate 20 to swing the forward arm toward the rail $g'$. In this position the foremost cap overhangs the edge of the plate 18 by something like 60% of its diameter. Serving to hold it in this position, in addition to the forward arm of the gate as just described, is a roll 21, Fig. 5, mounted between the ends of two arms 22, Figs. 5 and 6. These arms are pivoted at 23 on an adjustable part of the machine frame, and a weight 24 acts on them to apply a moderate pressure to the roll which, in turn, holds the heel of the cap down on the plate 18. This roll has a limited degree of movement controlled by the contact of the weight 24 with a part of the frame member 25.

Cooperating with the roll 21 is a plate 26 carried by an arm 27 which also is pivoted at 23, and this arm is weighted, as shown at 30, to hold it normally in a position slightly lower than that shown in Fig. 6. The rod to which the weight is connected with the arm 27 passes through a hole in the frame piece 31 so that it also acts as a stop to predetermine the normal position of the plate 26. This frame structure, including the parts 25 and 31, is supported mainly by a rod 28 which extends up into the stationary boss 23' and is adjustably secured to it by the set screw K.

From Fig. 6 it will be seen that as the jar J is carried along by the conveyor 3, its forward edge $j$ will slide under the extreme lower edge of the plate 18 and will strike the inner surface of the forward edge portion of the flange of the cap C". As the jar continues to be carried forward by the conveyor belt 3, it will pull the cap C" away from the gate 20 and out from under the plate 26 and the roll 21. It then will drop on to the upper end of the jar because the cap is larger than the extreme top of the jar. During this action the lightly weighted plate 26 holds the front of the cap down yieldingly but permits the cap to rise slightly as the jar pulls it out from under the plate. That is, the plate holds the forward edge of the cap and prevents it from being deflected upwardly above the jar and out of position for accurate engagement by the jar top.

Also during this operation the cap next behind that held at the capping point is pushed forward by those behind it and it swings the tail end of the gate 20, Fig. 12, out far enough to permit the cap to go past it into the position formerly occupied by the cap C''. But before it has arrived in that position it has swung the gate 20 back into the position illustrated in Fig. 12 where it again stops the cap next behind the foremost cap.

It may here be pointed out that the caps are prevented from buckling up as they slide through the guideway by a bar 19, Figs. 1 and 5, which overlies their path of travel from the time they enter the guideway until they reach the gate. Also, a roll 19', Fig. 1, bears on the caps at a point just before they leave the conveyor 15 and, due to its weight, assists in causing the belt to force the line of caps between it and the gate forward promptly upon the release of the foremost cap by the gate.

Thus as the jars are brought successively to the capping point, they pick up their respective caps, and the latter are registered properly on the jar tops while they are moving through the capping station. The action is entirely automatic and, because of the manner in which the caps and jars meet each other, the act of positioning each cap properly on its respective jar is accomplished with a high degree of accuracy.

Prior to reaching the capping point the jars on the belt 3 are carried between the tapered ends of guide rails 32, Fig. 5, which are suspended from above by links 33, as best shown in Fig. 4, and they are carried forward between these rails, through the capping station, to the mechanism which revolves and tightens the cap. At this point the jars are laterally supported by a feed wheel 35, Fig. 11, which engages one side of each jar, and a spring-actuated pressure plate 36 which engages the opposite side. This pressure plate has a yielding pad to make contact with the jar, a spring 37 which backs it up, and an arm 38 behind it and supporting the spring, this entire mechanism being mounted on one of the rails 32. Also, when the jar leaves the capping point, it passes immediately under a cap hold-down mechanism, which consists of two rails 40, Fig. 5, riding on the cap and pressing it down firmly on the jar. These rails are supported by a rod 41' which projects upwardly through a hole in the frame piece 31, Fig. 6. A collar L is set-screwed to the rod just above the part 31 and rests on the latter, thus suspending the rails. Loosely encircling the rod 41' is a weight 41 which rests on the rails. Also connecting these rails with the frame member 31 is another frame piece 34, Fig. 6, and this entire assembly can be adjusted vertically, as above described.

As the jar passes between the roll 35 and its cooperating pressure plate 36, the cap moves in between two rolls 42—42, best shown in Fig. 3. These rolls are rubber-surfaced and are revolved in such directions that they cooperate to rotate the cap in a clockwise direction and tighten it. This completes the capping operation, and the jar then is carried forward by the conveyor 3 out of the machine.

The tightening rolls 42 are suspended in bearings 44, Figs. 3, 13 and 14, on parallel pivots 45 so that the rubber-covered rolls 42—42 can swing toward and from each other, and they are pressed toward each other by springs, one of which is shown at 46, Fig. 14. Thus the rolls 42—42 yieldingly grip the jar cover and adjust themselves to minor variations in the diameter of successive covers. The rolls also can be adjusted toward and from each other by operating a screw 47, Fig. 5, having right and left threaded portions which are screw-threaded into the two bearing members 44—44. Above these members are pulleys 48 secured to the respective shafts of the two rolls 42—42 and they are revolved by a belt 50 driven from a pulley 51. Releasably secured on each roll shaft, and just above the roll, is a weight 43.

This drive of the tightening rolls 42—42 is accomplished through a clutch which forms a part of the pulley structure 51 and which functions in the manner disclosed in United States Patent No. 2,097,022. As there explained, the pulley structure includes a friction clutch driven continuously from some convenient source of power, but the clutch is free to slip under a very light load. It has sufficient traction to revolve the rolls 42—42 at a suitable speed for initiating the rotation of the caps but as any cap approaches its tight position the force required to turn it further increases, the clutch slips, and the final tightening torque or effort is applied by the kinetic energy stored in the rolls themselves and in the heavy weights 43 associated with them. This stops the rolls 42—42 but as soon as the cap passes out from between them they pick up speed again due to their driving connections with the pulley 51. Speed builds up with sufficient rapidity to create the desired kinetic energy in the rolls and the weights rotating with them by the time the next cap has come into position between the rolls. These weights are made interchangeable because the mass necessary to produce the desired degree of kinetic energy naturally will vary with the diameters of the caps.

Power to drive the various mechanisms above described is furnished by an electric motor 52, Figs. 2, 3 and 4. At one end it is equipped with a variable speed pulley 53, adjusted by the hand wheel 59, and this pulley is belt-connected with the input shaft of a gear reduction mechanism 54. The output shaft 55 of this mechanism carries a pinion driving a gear 56 fast on a shaft 57 which carries the pulley for driving the conveyor belt 5 that runs through the hopper 4. Also mounted on this shaft 57 is a crank arm driving a link 58 which is pivotally connected with the lower end of a plunger 60 that reciprocates in the bottom of the hopper and acts as a stirrer or agitator for the mass of caps.

A second pulley on the shaft of the motor 52, immediately beside the variable speed pulley 53, drives a belt 61, Figs. 2, 3 and 6, which, in turn, drives a shaft 62. Another belt 63 driven by this shaft runs over the guide pulley 64 and around the pulley 51, previously referred to, which drives the tightening rolls 42—42.

The output shaft 55, Fig. 2, of the gear reduction mechanism 54, carries a sprocket wheel driving a chain 65 that drives the shaft 66 by which the pulley for the cap-conveying belt 15 is driven. The other end of this belt runs over a pulley 67, Fig. 3, on a shaft 68 and is connected by bevel gears 69 to a vertical shaft 70, Figs. 1 and 5. A chain 71 driven by a sprocket wheel on the shaft 70 runs over a drive sprocket 73 fast on the shaft 74, on the lower end of which the large roll 35 previously referred to is mounted. As will readily be seen from an inspection of Fig. 5, the shafts of the two sprocket wheels 72 and 73 are supported for adjustment so that the position of the roll 35 can be changed to vary the spacing from its cooperating member 36 to accommodate jars of different diameters.

When the jar conveyor 3 is built into the machine, its driving pulley 75, Fig. 2, may be driven through belt connections with another pulley on the shaft 66, this shaft being laterally extended sufficiently to accommodate the second pulley. The conveyor 3, as shown in Figs. 2 and 3, is provided with its own frame or stand 76, which is independent of the machine frame.

As best shown in Figs. 2 and 4, a suitable frame is provided to support the various operating parts, and in order to be able to adjust the height of this frame conveniently, as to enable it to cooperate with the delivery conveyor of the jar-filling machine, mechanism is provided whereby this frame may be raised and lowered quickly. This mechanism comprises side rails 77—77 which support the uprights of the main machine frame, and these rails are pivotally connected by links 78 to similar rails 80, forming part of a machine base. Two of these side links 78 are connected together by a cross-piece 81, and struts 82, best shown in Fig. 2, connect this cross-piece with a nut 83 which is internally threaded. An externally threaded screw on the end of the shaft 84 is threaded into this nut but is prevented from moving axially by the thrust bearing 85, Fig. 4. Consequently, when the hand wheel 86 on one end of this shaft is revolved, it operates on the nut and its connections with the struts 82 to swing the front links 78—78 up toward a vertical position, or in the opposite direction, depending upon the direction of rotation of the hand wheel. The rear pair of links is compelled to swing with the front pair, with the result that the entire machine frame, and the parts mounted on it, are raised or lowered. Also, screw-threaded shafts 87, Fig. 4, at the four corners of the base, are individually adjustable to level the machine.

When this machine has been set up in proper relationship to the jar-filling mechanism, and the initial adjustments have been made to accommodate the particular jar to be handled, the machine then operates entirely automatically to feed, cap and deliver the jars. Little attention is required other than to keep the hopper supplied with caps. Because of the nature of the organization the machine will operate at a high rate of production. Moreover, a feature important in handling some commodities is that the jar is carried in a straight line through the machine, without stopping or starting, with no acceleration or deceleration, and no change in direction.

While the machine above described will handle a substantial degree of variation in cap sizes, a machine intended for universal use must be capable of handling a considerably wider range of shapes and sizes of caps. In addition, there is also a very substantial variety of jars which such a machine must be capable of accommodating. For these reasons the modification shown in Figs. 15 to 21, inclusive, has been devised. It differs from that above described primarily in four particulars, namely:

1. A hopper adjustable for width;
2. Certain improvements in the cap-feeding mechanism;
3. A mechanism for holding the jars at the cap tightening station which will accommodate either flat-sided or round jars; and
4. A simplified mechanism for driving the cap tightening rolls.

In Figs. 15 to 21 the parts corresponding to those illustrated in Figs. 1 to 14, inclusive, are designated by the same, but primed, numerals.

As best shown in Figs. 15, 16 and 18, the hopper 4' is fabricated mainly from flat sheets. The back portion M is stationary, while the portion in front of it is divided into two lateral sections N and N', Fig. 15, which are adjustable toward and from each other. Each of these sections includes a tubular fitting or thimble designated at 90 and 90', respectively, these members being welded or otherwise secured to their respective sections N and N'. Extending through both is a bar 91, the opposite ends of which are secured in the frame of the machine. Set screws in these thimbles can be loosened to permit the adjustment of the sections toward and from each other. This adjustment also uncovers more or less of the width of the parts 5'—5' at the bottom of the hopper on which the caps run.

Instead of the plunger type stirrer used in the construction above described, the hopper 4' is equipped with a continuously travelling agitator comprising a belt 92, Figs. 16 and 18, on which are mounted several strips of metal P, the central portions of which are flat where they are attached to the belts while their outer ends are bent upwardly so that, as they sweep through the mass of caps in the hopper, they will exert an effective stirring action and will break up any "bridging" of the caps, which sometimes tends to occur.

Immediately overlying the upper run of this belt 92 is a guard 93, Fig. 18, which is higher in the middle than at the edges, and serves to prevent the caps from striking the belt when they are dumped into the hopper. The cap conveyor 5' is driven by the shaft 57' in the same manner as in the construction previously described, but the stirrer belt 92 is driven by a chain 94 running over a sprocket wheel 95, Fig. 18, mounted on the same shaft with one of the pulleys for the belt. The chain 94 itself is driven by a sprocket wheel on the shaft 96 which is connected by a sprocket and chain mechanism with the output shaft 55' of the gear reduction unit 54'. Immediately above the lower run of the belt 92 is a deflector 97 which knocks off any cap that may happen to ride up on the belt 92 and thus prevents it from becoming jammed in the pulley just above the deflector. Also associated with the pulley just mentioned is a guard 98 which prevents caps falling down from above from getting fouled up with the belt or the pulley at this point. Coiled springs 9' knock off caps riding on top of other caps carried by the belt 5'.

The caps are delivered to the conveyor 5' exactly as previously described and go through the same gate mechanism to a delivery point where the foremost cap is stopped in a position partially overhanging the edge of the plate 18', Figs. 20 and 21. Here a roll 22a carried by arms 22' and a foot 26' carried by additional arms 27' cooperate to hold the cap in the proper position to meet the next jar J' coming along the belt 3'. Because this mechanism may have to be changed to suit different caps, the end of the chute is provided with a removable end plate 18', as shown in plan in Fig. 21. The plate has a right angle end section 100 shaped to slide into a dove-tail slot provided for it in the machine frame, and it carries the roll and foot just mentioned and the supporting means for them. Stop screws 101 are positioned for independent adjustment to engage the arms 22' and 27' to predetermine the normal height of the roll 22a and the plate 26'. Also, a gate 102 yieldingly cooperates with a rail 103 opposite to it to control the movements of the caps and to position them for registry with the respective jars which are to pick them up, this operation being performed in the same manner above described. Also, a gate 102 yieldingly cooperates with an opposite rail 103 to control the movements of the caps and position them for registry with the jar which is to pick it up.

In adjusting the machine for a different diameter of cap, the guideway leading the caps to the capping point may have to be adjusted for width, and if the change in diameter of the cap is substantial, then the end plate 18' of the chute or guideway is removed and is replaced by a similar plate having cap controlling and positioning elements suited to the requirements of the new cap. This replacement is effected simply by withdrawing the plate already in the machine from the dove-tail guideway in which the tail piece 100 is located and installing another in its place.

From this capping point the jars are carried under a hold-down plate and between two jar-feeding rolls 35', Figs. 15 and 19, which are rubber surfaced and simultaneously engage opposite sides of the jar. Their shafts 74' extend upwardly into gear boxes 104 mounted on rods 105, Figs. 15 and 19, for slidable adjustment toward and from each other, and such adjustment is afforded by the rod 106, Fig. 19, having right and left-hand screw-threaded portions threaded through lugs 107 which project upwardly from the respective gear boxes 104. Consequently, by turning the knob 108 on the end of this shaft, the jar-feeding rolls 35' can be moved toward or from each other, the rod 106 being held against axial movement. In each gear box a bevel gear, like that shown at 110, Fig. 19, is splined to a shaft 111 and drives a bevel gear 112 fast on its respective shafts 74' for the rolls 35'. This shaft 111 carries a sprocket wheel 113, Figs. 15 and 18, driven by the chain 94 previously referred to.

At the same time that the jar is moved between and into contact with the two rolls 35', the cap on the jar is carried between the two cap tightening rolls 42', mounted as previously described but, in this instance, driven by a simpler mechanism. That is, their driving rolls 43' are positioned to be simultaneously engaged by a driving roll 114 mounted on the end of a flexible shaft 115, Figs. 17 and 19, which runs directly to one end of the shaft of the motor 52'. The pressure with which this driving roll bears against the rolls 43' can be adjusted by the screw 116, Fig. 20, which is threaded into the bearnig block 117 for the end member of the flexible shaft, this bearing block riding on two horixontal bars Q, Fig. 15, supported in the machine frame. The shaft 116 is held against lengthwise movement. Spacing of the rolls 42' for operation on caps of different diameters can be effected by rotating the shaft 119, Figs. 15 and 19.

When the jar feeding rolls 35' move a jar forward sufficiently to carry its cap between the cap revolving rolls 42', the cap is pushed into position between the latter rolls with sufficient force to spread them apart against the tension of the springs which hold them toward each other. This establishes a good driving engagement of the yielding surfaces of the rolls with the cap at opposite sides of the latter. At the moment when initial engagement of the latter rolls with the cap occurs, the rolls are being driven by the shaft 115, but the separation of these rolls by the cap interrupts the driving contact of them with their driving roll 114. However, ample kinetic energy is already stored in the rolls 42' and the weight 43' to cause them to complete the operation of screwing down the cap tightly on to the jar. As soon as a cap moves out from between the rolls 42', their contact with the driving roll 114 is re-established and their kinetic energy is restored to normal very promptly. In this respect the mechanism above described accomplishes the same result as that disclosed in Patent No. 2,097,022 above referred to, but does it by a mechanism much better adapted for automatic machine capping.

In this connection it may be pointed out that this sub-combination which performs the operation of screwing the cap down in place on a jar is very useful of and by itself without any jar feeding mechanism. For small plants where the output is not sufficient to warrant the purchase of a fully automatic capping machine, such a mechanism is very satisfactory, the feeding of the jars to the cap tightening mechanism being performed by hand.

From the foregoing it will now be evident that the invention makes an important contribution to machinery for handling jars in any industry in which they are used in substantial volume. It effects an important saving in labor, reduces the floor space required to handle a given volume of material, and reduces the over-all expense of preparing these materials for the market.

In this connection it may be pointed out that the vertical adjustment of the capping mechanism by operating the hand wheel 86, as above described, is very useful in changing from one run of jars to another of different height. These jars travel on the conveyor 3 which, as clearly shown in Fig. 3, is supported independently of the machine frame. Consequently, adjustment of the entire capping mechanism as a unit to meet the requirements of jars of different heights can be made quickly and conveniently.

A further advantage of the cap handling mechanism above described is that the hopper 4 is positioned at waist level so that its operation and the quantity of caps in the hopper at any time can readily be observed. Also, as above described, the speed of the cap conveyor 5, and the agitator cooperating with it, can easily be changed whenever desired by adjustment of the variable speed pulley 53 so that the rate of delivery of caps to the capping mechanism can be adjusted to suit the demand required by different operating conditions. This cap feeding mechanism, while intended primarily for use with screw caps, is equally useful in handling caps of other types such, for example, as the pressure type. That the machine has ample provision for adjustment to handle caps of various diameters has already been pointed out, but the vertical adjustment provided by the mounting of the frame 31 and its cooperating frame parts 25 and 40 is valuable in accommodating variations in over-all height or thickness of the caps.

The unique method used in this machine for registering the caps with the jar tops contributes importantly to the simplicity of the machine because the caps are fed automatically as fast as may be required to keep a cap practically always in capping position. In other words, the feeding of these caps is accomplished without any timing devices responding to the rate of feed of the jars, which has been necessary heretofore. The capping operation takes place automatically, without requiring any mechanism controlled by the rate of feed of the jars or their spacing, and without any interruption of the continuous straight line movement of the jars through the machine. Thus much timing mechanism heretofore required has been eliminated.

While preferred embodiments of the invention have been herein described and illustrated, it will be evident that the invention is susceptible of embodiment in other forms without departing from the spirit or scope thereof.

Having thus described our invention, what we desire to claim as new is:

1. In a jar capping machine, the combination of a conveyor for feeding a series of open top jars through a capping station, means for feeding a series of jar caps in a line to said capping station, additional means for supporting the foremost cap in said line at said station with its forward edge tipped down in position to be engaged by the forward edge of the foremost jar in said series, said feeding means for the caps including a guideway for them and a gate near the end of said guideway including movable stop means arranged to be actuated by the foremost cap to stop the next cap behind it but to release the latter cap when the foremost cap is carried out of the guideway by a jar.

2. In a jar capping machine, the combination of a conveyor for feeding a series of open top jars through a capping station, means for feeding a series of jar caps in a line to said capping station, additional means for supporting the foremost cap in said line at said station with its forward edge tipped down in position to be engaged by the forward edge of the foremost jar in said series, said feeding means for the caps including a guideway along which they travel, and a gate near the end of said guideway pivoted to swing about an axis at one side of the guideway and provided with an arm to engage a cap at the end of the guideway and press it against the opposite wall of said guideway, said gate also having a rearwardly extending arm positioned to be held by said cap in the path of travel of the cap next behind it to stop the latter cap until the foremost cap is moved forward sufficiently to reach the gate.

3. In a jar capping machine according to preceding claim 1, a construction in which said guideway includes an end plate removably secured in said machine, said end plate supporting said gate and the cap guiding walls with which the gate is associated, whereby said end plate may be removed and replaced with another for handling caps of different dimensions.

4. That improvement in methods of applying screw caps to jars, comprising the steps of holding a cap on the top of a jar in registered relation thereto, and feeding the jar along a path which carries the jar top and its cap between and in contact with two power-driven rolls which engage said cap simultaneously at substantially diametrically opposite points on the outer surface of the rim of the cap, whereby said rolls revolve the cap in a direction to tighten it on said jar, and causing the passage of the cap between said rolls to free the rolls from their power connection before the tightening of the cap is completed so that the final tightening action is effected by the kinetic energy stored in said rolls and in parts revolving with them.

5. In a jar capping mechanism, the combination of two rolls, means supporting them for simultaneous contact with opposite sides of a screw cap mounted on a jar top, power-driven mechanism for revolving said rolls in directions to cause them to revolve the cap and screw it down on said jar, said power-driven mechanism comprising additional rolls mounted above said cap engaging rolls and revolving, respectively, with the latter, and a third power-driven roll positioned to frictionally engage both of said additional rolls simultaneously to drive the latter.

6. In a jar capping mechanism, the combination of two rolls, means supporting them for simultaneous contact with opposite sides of a screw cap mounted on a jar top, power-driven mechanism for revolving said rolls in directions to cause them to revolve the cap and screw it down on said jar, said power-driven mechanism comprising additional rolls mounted above said cap engaging rolls and revolving, respectively, with the latter, a power-driven roll positioned to frictionally engage both of said additional rolls simultaneously to drive the latter, and springs holding said cap engaging rolls yieldingly into contact with said cap whereby when said cap is forced between the two rolls that revolve it, it will force the latter rolls apart and thereby interrupt the engagement of said additional rolls with the roll that drives both of them.

7. In a jar capping machine, the combination of cap delivering mechanism comprising a hopper for supporting a loose mass of screw-type jar caps, a flexible conveyor running through said hopper and provided with parts operative to pick up the caps and carry them, one at a time, out of the hopper, a guideway to which the caps are delivered and which conducts them to the capping station, said guideway including a movable stop element cooperating therewith to selectively advance caps therealong and means between said conveyor and said station for upending those caps which are upside down and thereby reversing them.

8. In a jar capping machine, the combination of cap delivering mechanism comprising a hopper for supporting a loose mass of screw-type jar caps, a flexible conveyor running through said hopper and provided with parts operative to pick up the caps and carry them, one at a time, out of the hopper, a guideway to which the caps are delivered and which conducts them to the capping station, said guideway conducting the caps to the capping station, a second guideway shunting a part of the first guideway, and means in said shunt guideway for reversing those caps which are upside down and guiding them back into the first guideway again.

9. That improvement in methods of applying screw caps to jars comprising the steps of locating a cap on a jar in such registered relation as to permit the cap to be threaded on to the jar, guiding the jar and cap along a substantially horizontal path, and subjecting the cap while supported on the guided jar to a rotary frictional driving force which varies in intensity inversely with tightening of the cap as it becomes threaded on the jar.

FRED J. JOHNSON.
FRED J. JOHNSON, Jr.
ROBERT L. JOHNSON.

(References on following page)

REFERENCES CITED

The following references are of record in the file of this patent:

UNITED STATES PATENTS

| Number | Name | Date |
|---|---|---|
| 1,172,447 | Forte | Feb. 22, 1916 |
| 1,465,897 | Edwards et al. | Aug. 21, 1923 |
| 1,501,297 | Anderson | July 15, 1924 |
| 1,513,373 | Corporon | Oct. 28, 1924 |
| 1,518,557 | Boettcher | Dec. 9, 1924 |
| 1,600,715 | Cameron | Sept. 21, 1926 |
| 1,619,488 | Ruetz | Mar. 1, 1927 |
| 1,767,818 | Smulski | June 24, 1930 |
| 2,074,815 | Tevander et al. | Mar. 23, 1937 |
| 2,097,022 | Donahue | Oct. 26, 1937 |
| 2,235,922 | Friesenhahn | Mar. 25, 1941 |
| 2,336,606 | Everett | Dec. 14, 1943 |
| 2,400,419 | Hohl et al. | May 14, 1946 |
| 2,435,127 | Cameron | Jan. 27, 1948 |
| 2,440,030 | Thomas | Apr. 20, 1948 |